H. MECKING.
GATE FOR DUMPING TRUCKS.
APPLICATION FILED AUG. 18, 1920.

1,400,369.

Patented Dec. 13, 1921.
2 SHEETS—SHEET 2.

WITNESSES

INVENTOR
H. Mecking

ATTORNEYS

UNITED STATES PATENT OFFICE.

HERMAN MECKING, OF NEW YORK, N. Y.

GATE FOR DUMPING-TRUCKS.

1,400,369.  Specification of Letters Patent.  Patented Dec. 13, 1921.

Application filed August 18, 1920. Serial No. 404,400.

*To all whom it may concern:*

Be it known that I, HERMAN MECKING, a citizen of the United States, and a resident of the city of New York, borough of the Bronx, in the county of Bronx and State of New York, have invented a new and Improved Gate for Dumping-Trucks, of which the following is a full, clear, and exact description.

The invention relates to end gates for dumping trucks as shown and described in the application for Letters Patent of the United States, No. 318,827, filed by me on August 20, 1919.

The object of the invention is to provide a new and improved gate for endwise dumping on automobile or power driven trucks or for sidewise dumping on railroad cars and the like, and arranged to insure an automatic opening of the gate on swinging the body into dumping position.

Another object is to prevent dirt or other fine particles of the load from lodging in the joints between the body and the gate thus insuring free opening movement of the gate.

Another object is to locate the locking means for the gate out of the path of the material sliding out of the body during the dumping operation, thus preventing injury to the locking means and allowing the material to slide unobstructedly out of the body.

Another object is to securely hold the gate in locked position at the time the truck body is in horizontal or loading position.

With these and other objects in view, the invention consists of certain novel features of construction as shown and described hereinafter and then specifically pointed out in the claims.

A practical embodiment of the invention is represented in the accompanying drawings forming a part of this specification, in which similar characters of reference indicate corresponding parts in all the views.

Fig. 4 is a sectional plan view of part of the improvement on the line 4—4 of Fig. 1;

Fig. 5 is a similar view of the locking means for locking the gate in position on the truck body, the section being on the line 5—5 of Fig. 1; and Fig. 6 is a rear end elevation of the same.

Figure 1:
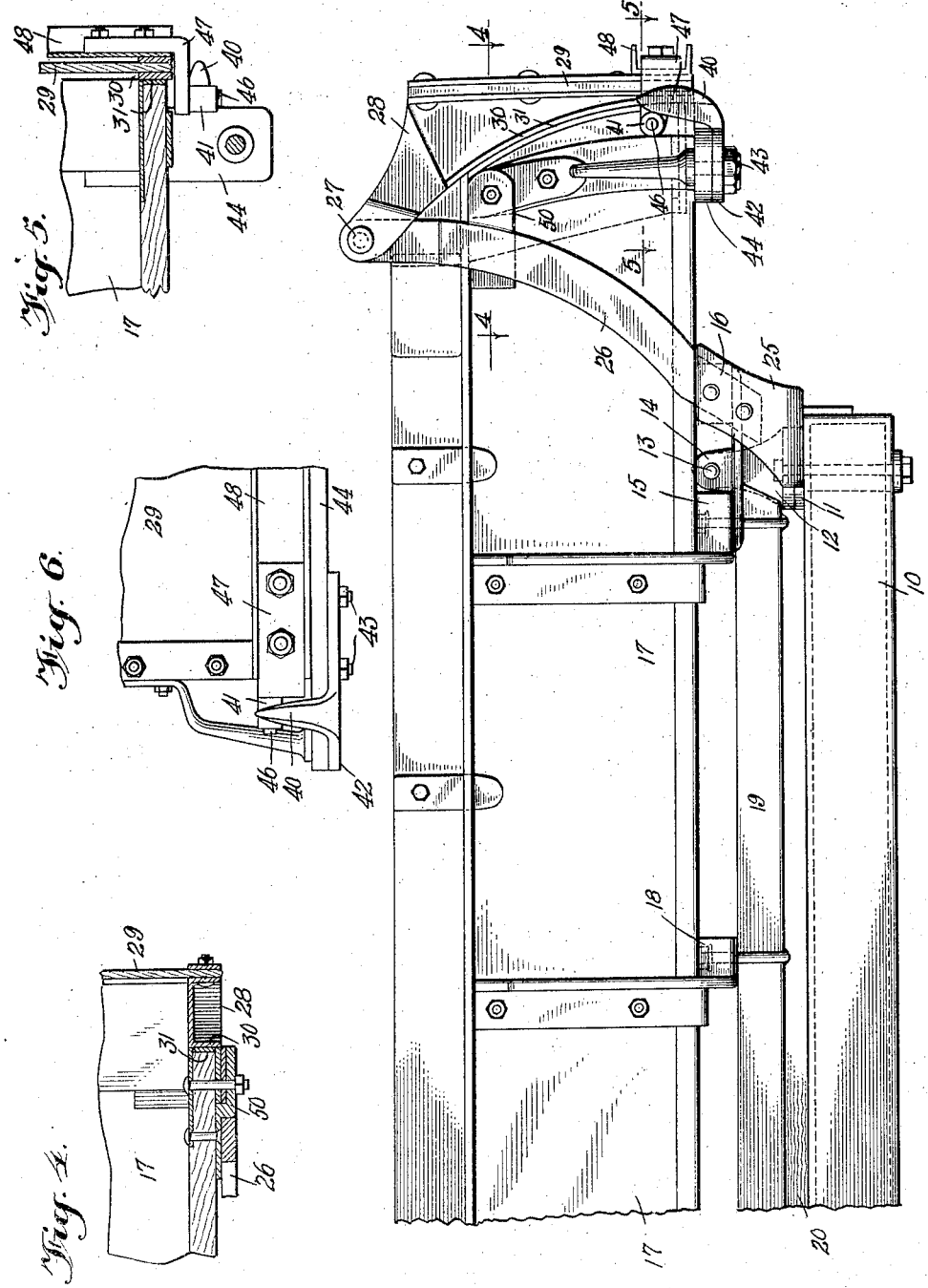
Figure 1 is a side elevation of the gate in closed position on the rear end of an automobile truck.
Figure 2:
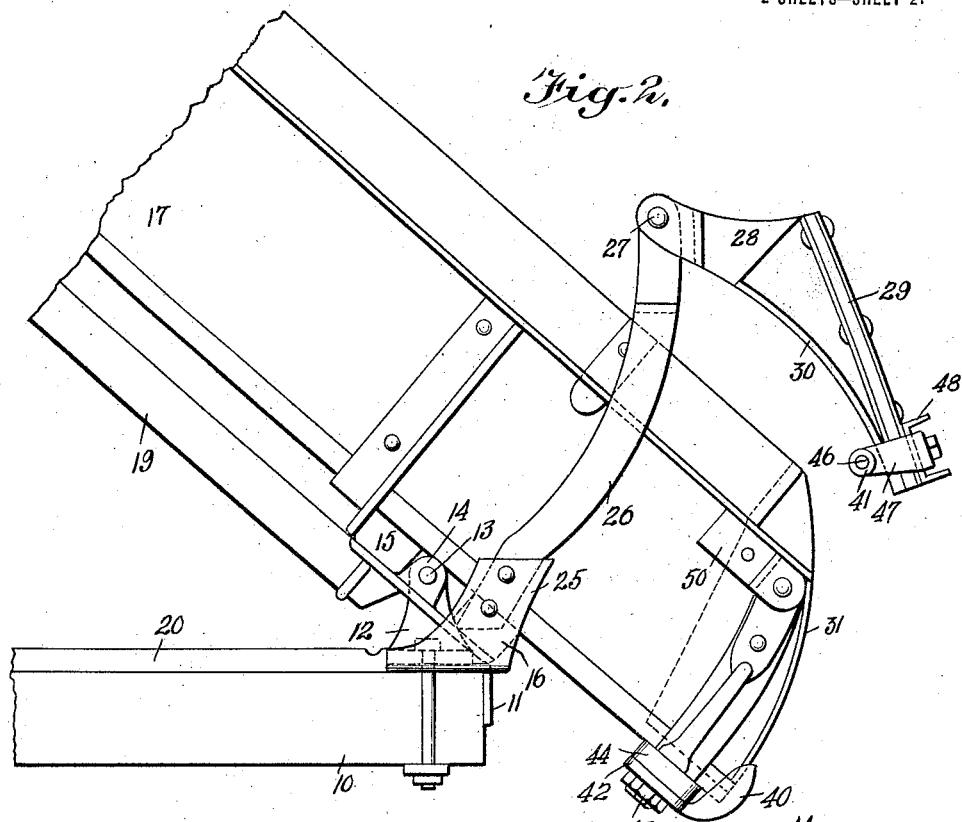
Fig. 2 is a similar view of the same with the truck body swung into dumping position and the end gate into open position.
Figure 3:
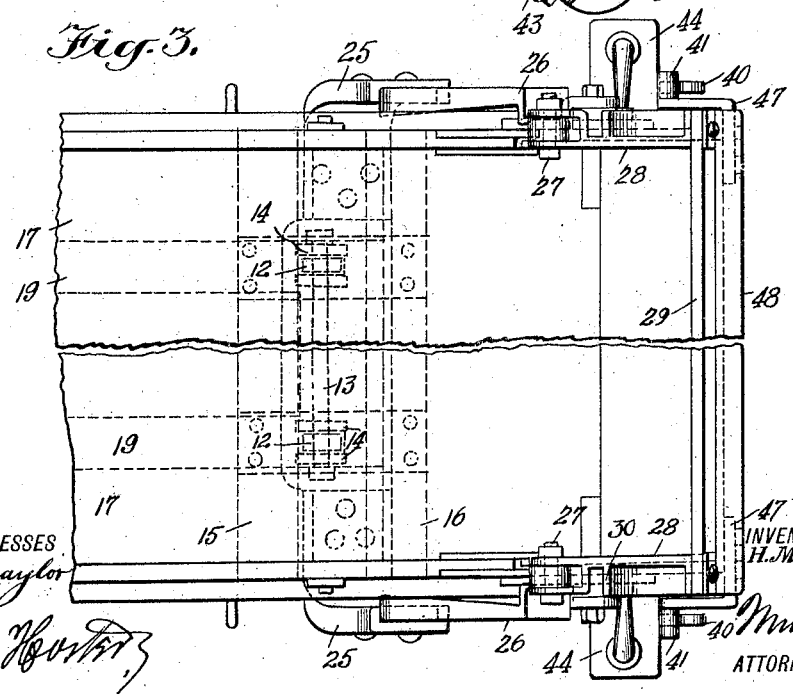
Fig. 3 is a plan view of the gate as applied and in the closed position shown in Fig. 1.

On the rear end of the frame 10 of the automobile truck is secured a transversely extending bar or beam 11 on which are fastened upwardly extending lugs 12 through which passes a transverse pivot 13 also passing through lugs 14 attached to transverse beams 15 and 16 secured to the under side of the truck body 17 near the rear end thereof, as plainly shown in Figs. 1, 2 and 3. The truck body 17 is provided with additional transverse beams 18 and on the latter and the transverse beam 15 are secured side bars 19 adapted to rest on wearing plates 20 attached to or forming part of the frame 10. By the arrangement described, the truck body 17 is normally supported in horizontal or loading position and the truck body 17 can be readily swung into dumping position, as indicated in Fig. 2, without interference with the rear traction wheels of the automobile truck and with the rear end of the truck frame 10.

The bar or beam 11 is provided at the sides with brackets 25 to which are secured upwardly and rearwardly extending side members 26 between which extends the rear portion of the truck body 17. The upper ends of the side members 26 are provided with transverse pivots 27 on which are mounted to swing filling pieces 28 secured to the front face of a gate or tailboard 29 at the sides thereof. The forward edges 30 of the filling pieces 28 are segmental and fit onto correspondingly shaped rear edges 31 of the sides of the truck body 17 to provide segmental joints between the filling pieces 28 and the rear ends of the sides of the truck body 17 at the time the latter is in horizontal or loading position and the gate 29 is in closed position. It will be noticed that the gate 29 when in closed position extends approximately vertically and the gaps between the end gate 29 and the sides of the truck body 17 are closed by the filling pieces 28 thus preventing the dirt or other material forming the load from dropping out of the body during the time the latter is in horizontal position.

In order to securely lock the end gate 29 in closed position and to insure a firm contact between the edges 30 and 31, the following arrangement is made: On each side of the truck body 17 and the gate 29 are two coacting locking members 40 and 41 for locking the end gate in position and drawing it firmly into place. The locking member 40 on each side of the truck body 17 is in the form of a hook and located outside of the open end of the truck body 17 so as to be completely out of the way of the load sliding out of the open end of the truck body 17 at the time the latter moves into dumping position. Each locking member 40 is provided with a bracket 42 fastened by bolts or other fastening devices 43 to a transverse beam 44 secured to the under side of the truck body 17 at the rear end thereof. The other locking member 41 on each side of the end gate 29 is preferably in the form of a friction roller journaled on a stud 46 projecting from a bracket 47 bolted or otherwise fastened to a cross beam 48 attached to the outer face of the end gate 29 at the lower end thereof to reinforce the said end gate besides forming a support for each of the brackets 47. The forward edges of the locking members 40 are cam-shaped to insure a tight closing of the end gate 29 at the time the truck body 17 swings downward into horizontal position, and the friction rollers forming the locking members 41 engage the cam faces of the locking members 40.

When the truck body 17 is in horizontal or loading position, as shown in Figs. 1 and 3, then the end gate 29 is locked against opening by the locking members 41 engaging the locking members 40. When the truck body 17 swings into dumping position, as shown in Fig. 2, then the locking members 40 swing downward with the rear end of the truck body and consequently the locking members 40 move out of engagement with the locking members 41 mounted on the tailboard 29 hung on the fixed pivots 27. When the truck body 17 swings back to its normal horizontal position then the locking members 41 reëngage the forward cam faces of the locking members 40, and the upward movement of the locking members 40 moves the locking members 41 forwardly thus firmly seating the segmental edges 30 of the filling pieces 28 of the end gate 29 on the segmental rear edges 31 of the sides of the truck body 17. Thus by the arrangement described the end gate 29 is securely locked in place and a firm joint is had between the contacting edges 30 and 31 thus preventing the dirt or other material loaded into the truck body 17 from lodging in the joints and obstructing the free opening movement of the end gate as above explained. It will further be noticed that the locking members 40 and 41 are completely out of the way of the material sliding out of the truck body 17 at the time the latter moves into dumping position, and hence the locking members 40 and 41 are not liable to be injured by stones, rocks or other material constituting the load, and the locking members 40 and 41 are not liable to obstruct the material as the latter passes out through the rear open end of the truck body 17. By reference to Fig. 2 it will be noticed that the gate or tailboard 29 is free to swing rearwardly and upwardly at the time the truck body 17 is in dumping position thus allowing rocks or other large matter contained in the truck body and sliding out of the same to pass the gate. If desired, the gate or tailboard 29 can be swung by the operator upwardly and forwardly into completely open position.

Against the rear edges of the side members 26 abut blocks 50 bolted or otherwise secured to the outer faces of the sides of the truck body 17, the said blocks forming supports for the side members 26 at the time the truck body 17 moves downward into horizontal or loading position. By the arrangement described the side members 26 are not liable to be bent out of shape and hence the end gate 29 is at all times free to swing into open or closed position on moving the truck body 17 into dumping position or back into horizontal or loading position.

Having thus described my invention, I claim as new and desire to secure by Letters Patent:—

1. A dumping truck, comprising a truck frame, a bracket attached to the said truck frame, a body mounted to swing on the said bracket and having a dumping opening, a gate hung at its upper end on the said bracket and normally closing the said dumping opening, friction rollers journaled on the sides of the said gate at the lower free end thereof, and hooks adapted to be engaged by the said friction rollers to lock the gate in closed position, the said hooks being fixed on the said body on opposite sides of the said dumping opening.

2. A dumping truck, comprising a truck frame, a pivoted body open at its rear end, a bracket attached to the rear end of the said truck frame and between which the said body is mounted to swing from normal horizontal or loading position into inclined or dumping position, the said bracket having rising side members, and lugs fixed on the sides of the said body adjacent its rear end and against which the said side members of the bracket abut at the time the said body is in horizontal or loading position.

3. A dumping truck, comprising a truck frame, a bracket attached to the rear end of the truck frame and provided with rising side members, a pivoted body mounted to swing between the side members of the bracket and provided at the sides adjacent its rear end with lugs adapted to abut against the side members at the time the body is in horizontal or loading position, and a gate hung on the said side members and adapted to close the rear end of the body.

4. A dumping truck, comprising a truck frame, a bracket attached to the rear end of the truck frame and provided with rising side members, a pivoted body mounted to swing between the members of the said bracket and having the rear edges of its sides of segmental shape, an end gate adapted to close the rear end of the said body and provided at the sides with forwardly extending filling pieces pivoted on the said side members and having their forward edges of segmental shape and fitting the rear edges of the sides of the body at the time the latter is in horizontal position, the said filling pieces filling the gaps between the gate and the said rear edges of the sides of the body, hooks on the said body and having cam faces, and rollers journaled on the end gate and adapted to engage the said cam faces of the hooks to draw the edges of the filling pieces into firm contact with the rear edges of the sides of the body.

HERMAN MECKING.